(12) United States Patent
Nakano et al.

(10) Patent No.: US 6,636,420 B2
(45) Date of Patent: Oct. 21, 2003

(54) INFORMATION PROCESSING DEVICE

(75) Inventors: Rumi Nakano, Tokyo (JP); Yukio Isogai, Aichi (JP); Kaoru Hayashi, Kanagawa (JP); Osamu Gomibuchi, Chiba (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 09/942,406

(22) Filed: Aug. 29, 2001

(65) Prior Publication Data

US 2002/0044410 A1 Apr. 18, 2002

(30) Foreign Application Priority Data

Aug. 31, 2000 (JP) ........................................ 2000-264238

(51) Int. Cl.[7] ................................................. G06F 1/16
(52) U.S. Cl. ...................... 361/682; 364/708; 248/917; 341/22
(58) Field of Search ................................ 361/682, 681, 361/732; 364/708; 248/917–923; D14/106; 340/700, 711; 341/22

(56) References Cited

U.S. PATENT DOCUMENTS

| 5,247,285 | A | * | 9/1993 | Yokota et al. ............... 361/680 |
| 5,666,273 | A | * | 9/1997 | Kurcbart ...................... 361/681 |
| 6,247,674 | B1 | * | 6/2001 | Jawidzik ................... 248/213.2 |
| 6,262,886 | B1 | * | 7/2001 | DiFonzo et al. ............ 361/683 |

* cited by examiner

*Primary Examiner*—Darren Schuberg
*Assistant Examiner*—Hung Van Duong
(74) *Attorney, Agent, or Firm*—Frommer Lawrence & Haug LLP; William S. Frommer; Leonard J. Santisi

(57) ABSTRACT

An information processing device comprises a main body, a display part provided so as to be turned with respect to the main body, and a handle that is provided so as to be turned with respect to the main body on the same axis line as the turning shaft of the display part and is composed of vertical parts that are vertical to the turning shaft and a hold part connected to the vertical parts and arranged side by side at a specified distance from the turning shaft. When the main body is placed, the handle is turned to the main body side, so that the hold part is positioned under the bottom surface of the main body to incline the main body.

3 Claims, 12 Drawing Sheets

INFORMATION PROCESSING DEVICE

BACKGROUND OF THE INVENTION

1. Field of the Invention

This invention relates to an information processing device, and more particularly, is suitably applied to a notebook-sized personal computer.

2. Description of the Related Art

Conventional personal computers includes a notebook-sized personal computer (hereinafter, this is referred to as notebook computer) in which a display part having a thin display means such as a liquid crystal display panel or the like is provided so as to be turned with respect to a flat plate-like main body with a built-in mother board, HDD, etc.

When such notebook computer is used, the display part is opened from the main body so that a use can use the keyboard provided on the upper surface of the main body and also view the display means. When it is carried, the display part is shut against the main body to unify the main body and the display part, which makes the overall size of the notebook computer 1 smaller and improves its portability.

Some of the notebook computers have a handle to improve its portability: a user holds the handle to hang the notebook computer.

When such notebook computer is used, however, since the handle does not function, it is unnecessary. In addition, another problem is that the notebook computer becomes larger and the usability becomes worse.

SUMMARY OF THE INVENTION

In view of the foregoing, an object of this invention is to provide an information processing device which offers high portability and good usability.

The foregoing objects and other objects of the invention have been achieved by the provision of an information processing which comprises: a main body; a display part provided so as to be turned with respect to the main body; and a handle having vertical parts to the turning shaft of the display part and a hold part that is attached to the vertical parts and arranged side by side at a specified distance from the turning shaft, provided so as to be turned with respect to the main body on the same axis line as the turning shaft of the display part. When the main body is placed, the handle is turned to the main body side, thereby the hold part is positioned and projects from the bottom surface of the main body, which inclines the main body.

By providing the handle on the same axis line as the turning shaft of the display part, the turning shaft of the handle is set on the upper surface of the main body. Thus, even if the vertical parts of the handle are lengthened to improve the holdablity of the handle, the hold part does not excessively project from the bottom surface of the main body. Therefore, the information processing device can offer both of the portability and the operability in using.

According to this invention as described above, by providing a handle on the same axis line as a turning shaft of a display part so as to be turned, in order to hang an information processing device when carried, the turning shaft of the handle is set on the upper surface of the main body. Therefore, even if the vertical parts of the handle are lengthened so that it becomes more comfortable to hold the handle, the hold part does not excessively project from the bottom surface of the main body. Therefore, the information processing device can offer both of the portability and the operability in using. Thus, a convenient information processing device can be accomplished.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
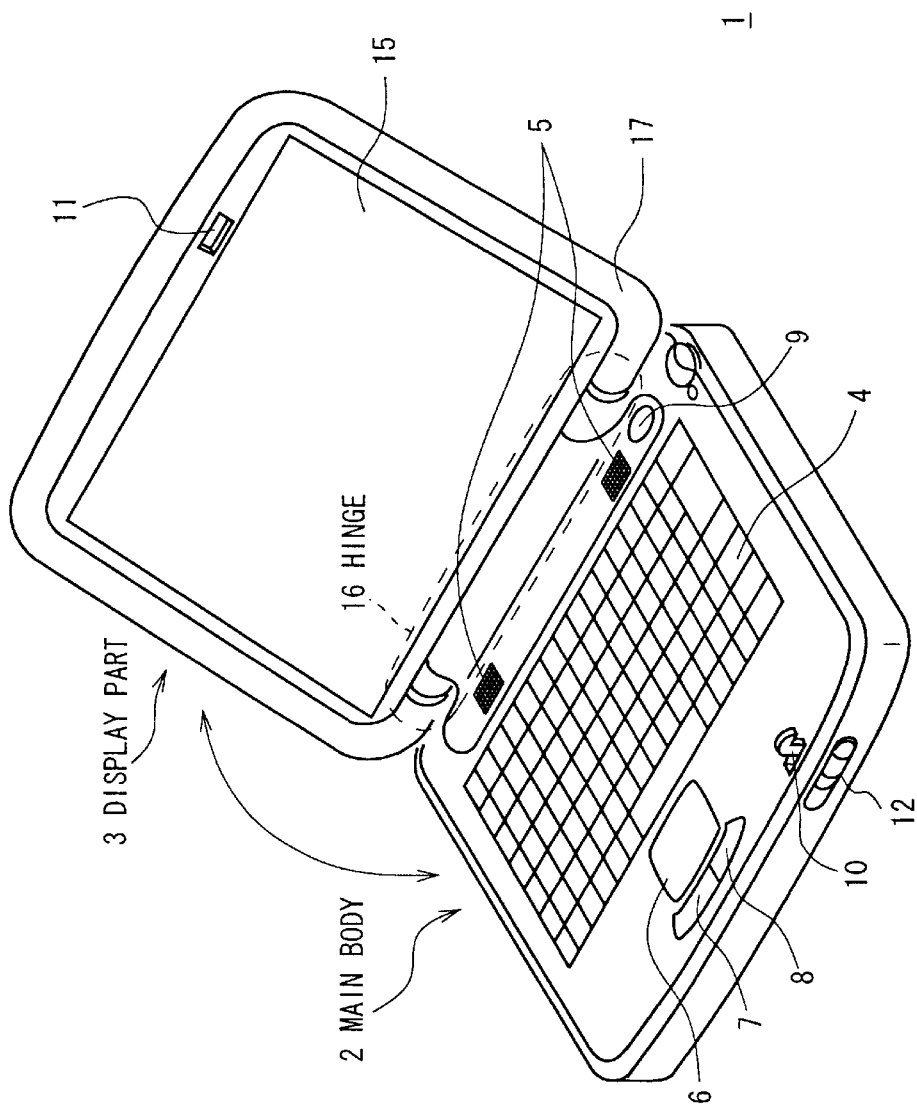
FIG. 1 is a schematic perspective view showing one embodiment of a notebook computer according to this invention.

Preferred embodiments of this invention will be described with reference to the accompanying drawings:

Referring to FIG. 1, a reference numeral 1 generally designates a notebook-sized personal computer to which this invention is applied (hereinafter, this is referred to as notebook computer). The notebook computer 1 is composed of a main body 2, and a display part 3 which is provided on the rear end of the upper surface of the main body 2 so as to be opened and folded from/against the main body 2.

Provided on the upper surface of the main body 2 are a keyboard 4 which is composed of plural operation keys for entering various characters, symbols and numerals, two speakers 5, a touch pad 6 to be used for moving a cursor, a left click button 7 and a right click button 8 which respectively correspond to a left button and a right button of an ordinary mouse, and a push-type power button 9.

A claw 10 is provided close to the right of the touch pad 6 at the front end of the upper surface of the main body 2, and a hole part 11 is provided at a specified position corresponding to the claw 10 on the display part 3. In the state where the display part 3 is folded against the main body 2, the claw 10 is engaged with the hole part 11 and locked, so that the display part 3 is kept in a closed state.

Furthermore, a slide lever 12 is provided at the front of the side surface of the main body 2. By sliding the slide lever 12, the claw 10 engaged with the hole part 11 can be released, and then the display part 3 can be opened from the main body 2.

Provided on the front surface of the display part 3 is an LCD 15 using an LCD panel that is a thin film transistor-liquid crystal display (TFT-LCD).

On the other hand, a periphery protector 17 which is a round pipe made by bending synthetic resin, for example, ABS, is arranged around the peripheral part except for a hinge 16 that connects the main body 2 to the display part 3.

Figure 2:
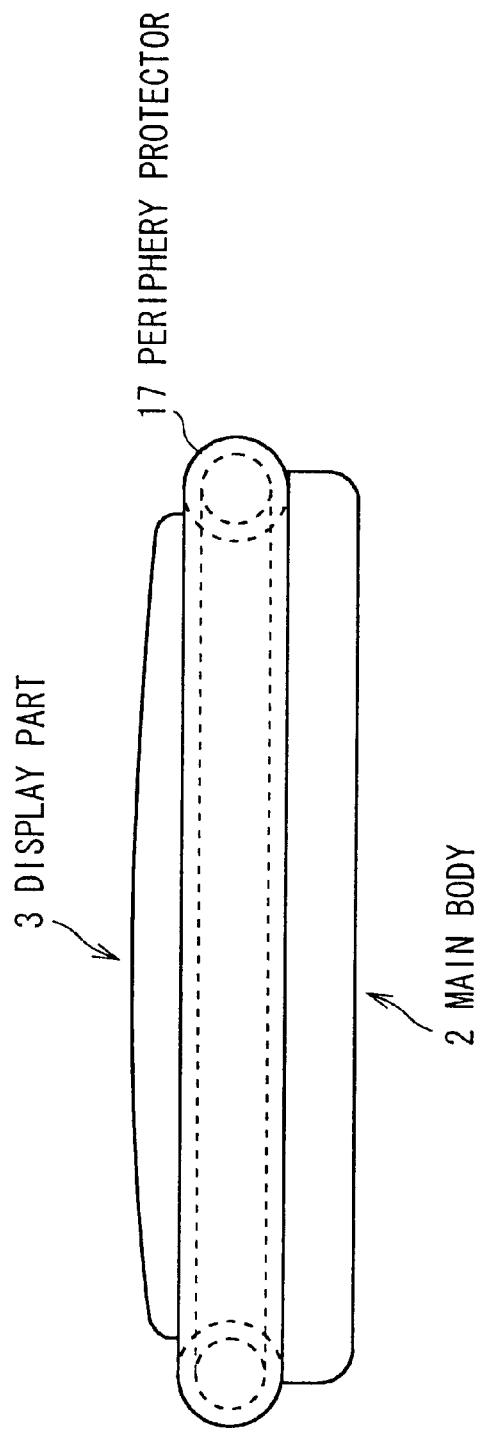
FIG. 2 is a schematic diagram showing the relationship between a periphery protector and a main body.

As shown in FIG. 2, the outer circumference of the periphery protector 17 outwardly projects more than the peripheral part of the main body 2. It is because the periphery protector 17 receives shocks applied from the outside in carrying or other situations, to protect the main body 2 that contains precision units such as an HDD etc. against the shock.

Moreover, the periphery protector 17 is hollow inside. It is because the periphery protector 17, when receiving a shock, is moderately deformed in order to absorb the shock, as well as reducing the weight.

Figure 3A:
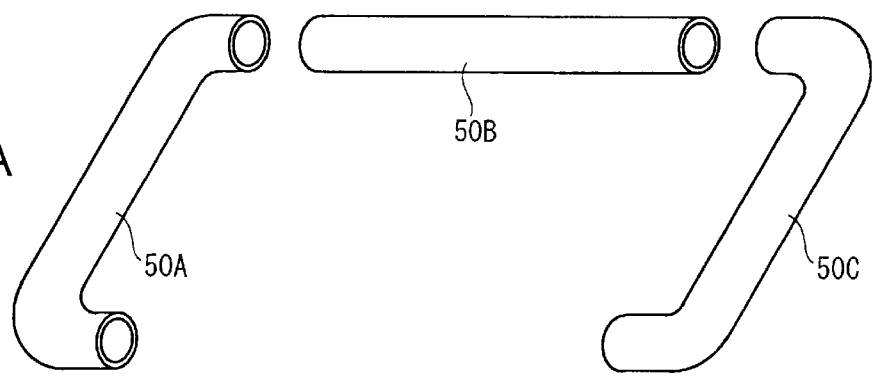
FIGS. 3A and 3B are schematic perspective views showing examples of a pipe member manufacturing method.
Figure 3B:
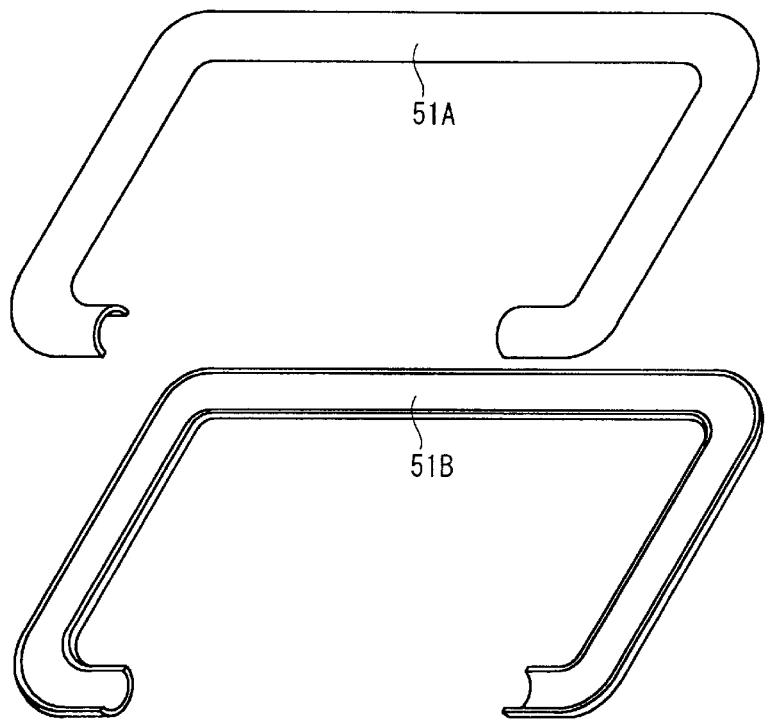

In general, it is considered that a bent pipe member as the periphery protector 17 is made by bonding plural pipe members 50A to 50C which are obtained by dividing the bent pipe member into relatively simple shaped members as shown in FIG. 3A, or by joining U-shaped half body members 51A and 51B which are obtained by vertically dividing the bent pipe member into two as shown in FIG. 3B.

However, both of these manufacturing methods need adhesive or welding to join these members. Which exist problems in the intensity of joining parts, the bad outward appearance, and a complicated manufacturing process.

On the contrary, in the notebook computer 1 according to this invention, the periphery protector 17 is formed by injection molding using a hollow molding method which is called a gas assist molding method, thereby the periphery protector 17 can be hollow inside and be in one body without dividing. Thus, the intensity of the periphery protector 17 and the quality of the outward appearance can be improved.

Figure 4A:
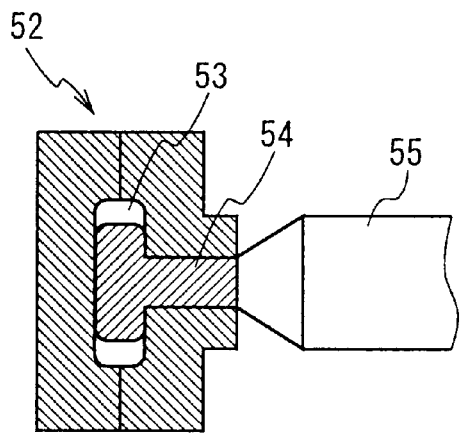
FIGS. 4A and 4B are schematic diagrams showing the principle of a gas assist forming method.
Figure 4B:
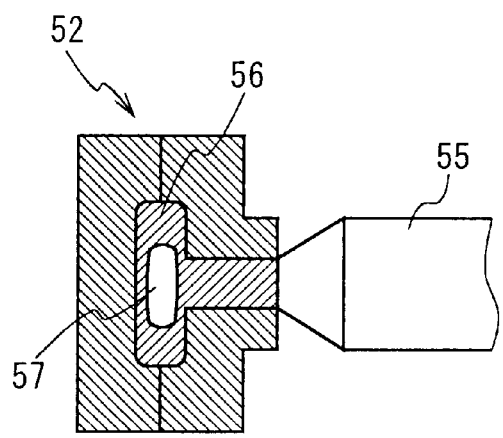

FIGS. 4A and 4B show the principle of gas assist molding method. A cavity 53 in a metal mold 52 is filled with a smaller amount of molten resin 54 than the capacity of the cavity 53 from an injection nozzle 55 (FIG. 4A). Then inert gas such as nitrogen gas is injected to make a hollow part 57 inside the molded good 56 (FIG. 4B).

In the notebook computer 1, by attaching the periphery protector 17, which is hollow inside and is in one body, made by the gas assist molding method as described above, around the display part 3 so as to overhang outer than the circumference of the main body 2, the periphery protector 17 can surely absorb shock from the outside, to protect the main body 2 and the display part 3.

Figure 5:
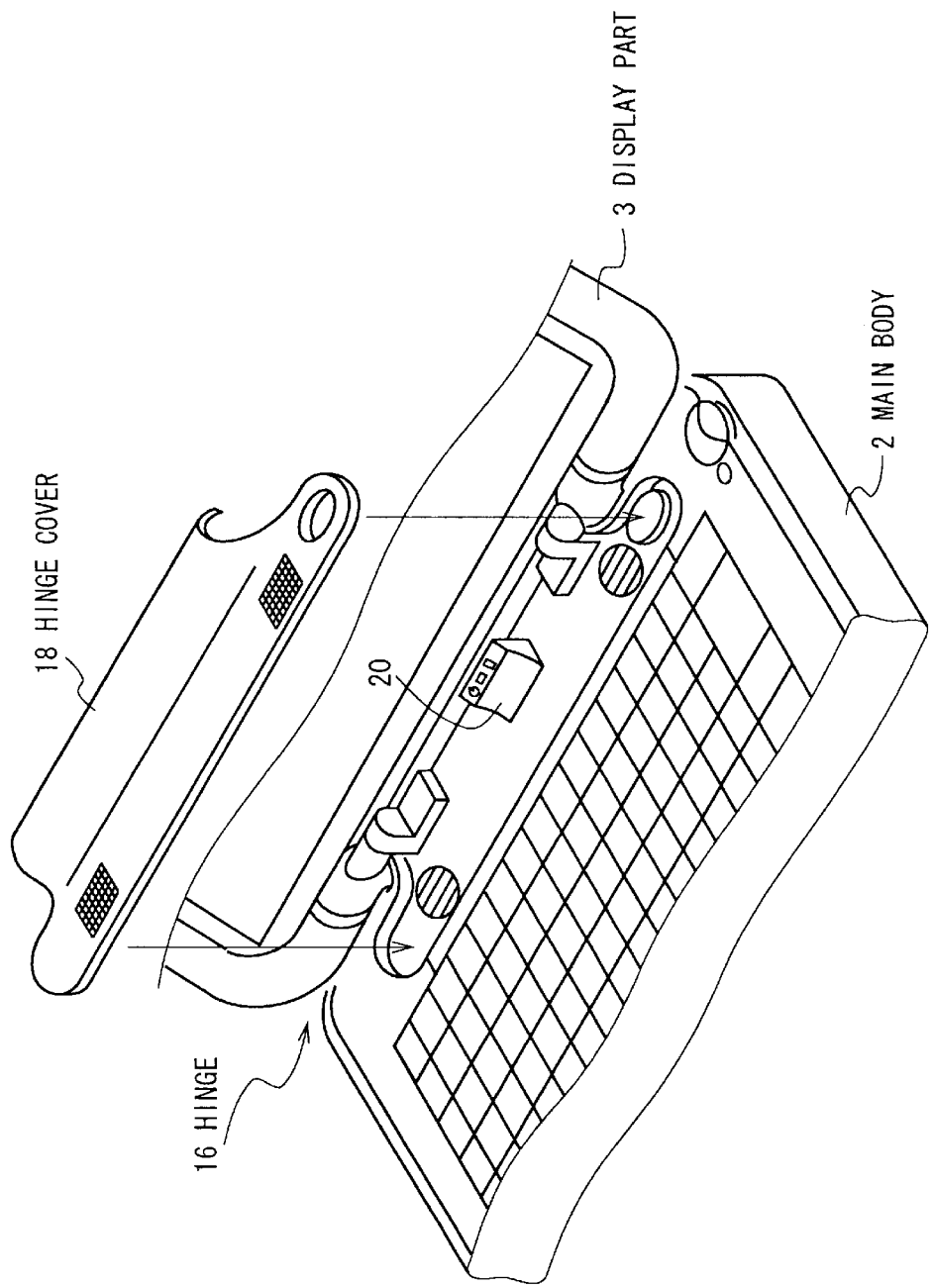
FIG. 5 is a schematic perspective view showing the relationship between a hinge cover and an indicator.

In addition, an indicator 20 is placed in a hinge cover 18 on the main body 2 to display the operating state of the notebook computer 1 as shown in FIG. 5.

Figure 6:
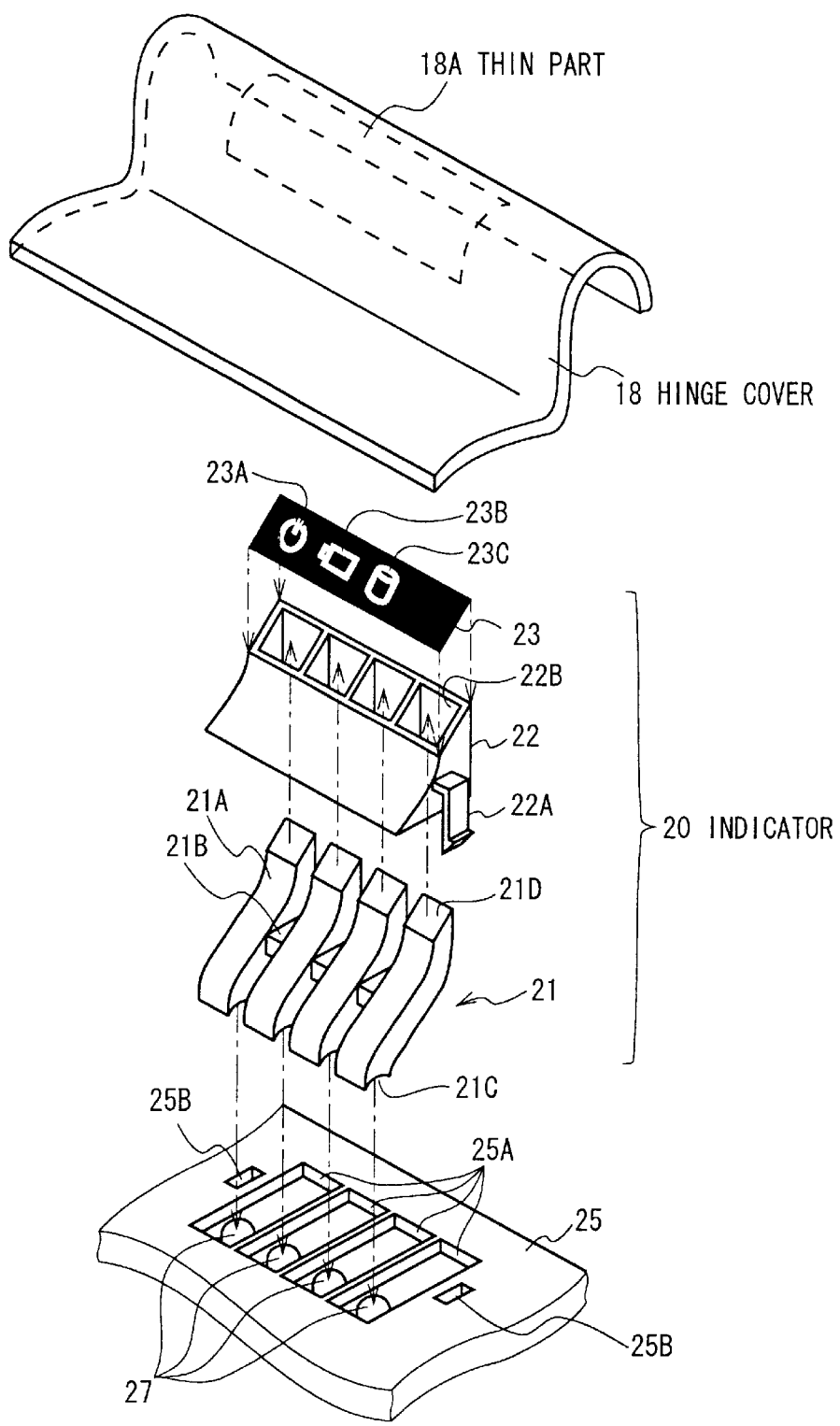
FIG. 6 is a schematic perspective view showing the structure of the indicator.

FIG. 6 shows the structure of the indicator 20 that is composed of a light-conducting member 21, a light shielding member 22 and a mask seal 23.

The light-conducting member 21 is formed by connecting four S-shaped prism light-conducting parts 21A with connecting parts 21B, and they are molded in one body by acrylic resin having good light conductivity. In the light-conducting member 21, the light-receiving surfaces 21C of the light-conducting parts 21A receive and conduct corresponding illumination lights irradiated from light emitting diodes (LEDs) 27 disposed in four openings 25A provided on a chassis 25 in the main body 2, and emit the received lights from light-emitting surfaces 21D.

The light shielding member 22 is made of a black plastic member in an almost trapezoidal cylindrical shape so as to correspond to the shape of the light-conducting member 21. The light shielding member 22 stores the light-conducting member 21 inside and covers the parts other than the light-receiving surfaces 21C and light-emitting surfaces 21D to prevent unnecessary leakage of light.

Furthermore, a fitting claw 22A is provided on the both sides of the light shielding member 22, so that the stored light-conducting member 21 is kept at a specified position by engaging them with holes 25B on the chassis 25.

The mask seal 23 is transparent sheet material such as vinyl chloride, and attached to the light shielding member 22 so as to cover the openings 22B of the light shielding member 22. One side of the mask seal 23 has designs of a power mark 23A showing that the power of the notebook computer 1 is ON, a battery mark 23B showing the charge level, and an HDD access mark 23C showing the state of accessing to a hard disk drive (HDD) written in white in a black background.

The power mark 23A, the Battery mark 23b and the HDD access mark 23C are provided at positions so as to face the corresponding light-emitting surfaces 21D of the three light-conducting parts 21A. Then each design is luminously displayed by illumination lights emitted from the light-emitting surfaces 21D.

On the other hand, the hinge cover 18 is made of transparent plastic material such as a polycarbonate, and is colored in mauve, for example. This hinge cover has a rectangular thin part 18A created by thinning the inside of the area facing to the mask seal 23, so that a user can see the lighted marks 23A to 23C through the thin part 18A. Therefore, in the notebook computer 1, the user can see only the lighted marks 23A to 23C through the hinge cover 18, and can not see the non-lighted marks 23A to 23C and the light shielding member 22 since they are shielded by the hinge cover 18.

Here, as the general structure of an indicator in a conventional notebook computer, the same number of display holes as marks to be displayed need to be provided in an enclosure, the tip of a light-conducting member is inserted in the above display hole and exposed on the surface of the enclosure, and illumination lights from light sources such as LEDs provided inside the enclosure are conducted outside the enclosure by the light-conducting member and are displayed.

However, in this indicator, the same number of display holes as marks need to be provided in the enclosure. Therefore, the indicator has a problem in the case the number of marks to be displayed is to be changed according to a change in the specification of the notebook computer, the number of the display holes must be changed accordingly and the design of the enclosure itself must be changed.

On the contrary, in the notebook computer 1 according to this invention, the indicator 20 is provided in the hinge cover 18, and the marks 23A to 23C are displayed through the hinge cover 18. Thus, the number of marks and its design can be changed only by changing the print pattern of the mask seal 23, without changing the hinge cover 18 itself.

More specifically, while the light-conducting member 21 has four light-conducting parts 21A, three marks 23A to 23C are printed on the mask seal 23 and the right light-conducting part 21A is unused.

If the number of marks to be displayed is to be increased to four according to a change in the specification of the notebook computer 1, the light-conducting member 21 can cope with the change in the specification only by changing the mask seal 23 having the current print pattern to one having a new print pattern including a new mark at a position corresponding to the right light-conducting part 21A. Similarly, if the number of marks to be displayed is decreased, it can cope with the change in the specification only by changing the print pattern of the mask seal 23.

Furthermore, in the indicator in a conventional notebook computer, since the tip of a light-conducting member is inserted into a display hole, the positioning of the light-conducting member when the notebook computer 1 is assembled is difficult. On the contrary, the assembly of the indicator 20 according to this invention is completed, independent from the hinge cover 18, therefore even if the relative position between the hinge cover 18 and the indicator 20 deviates, it does not hinder the assembly of the notebook computer 1. This is an advantage that the assembly of the notebook computer 1 becomes easy.

Figure 7:
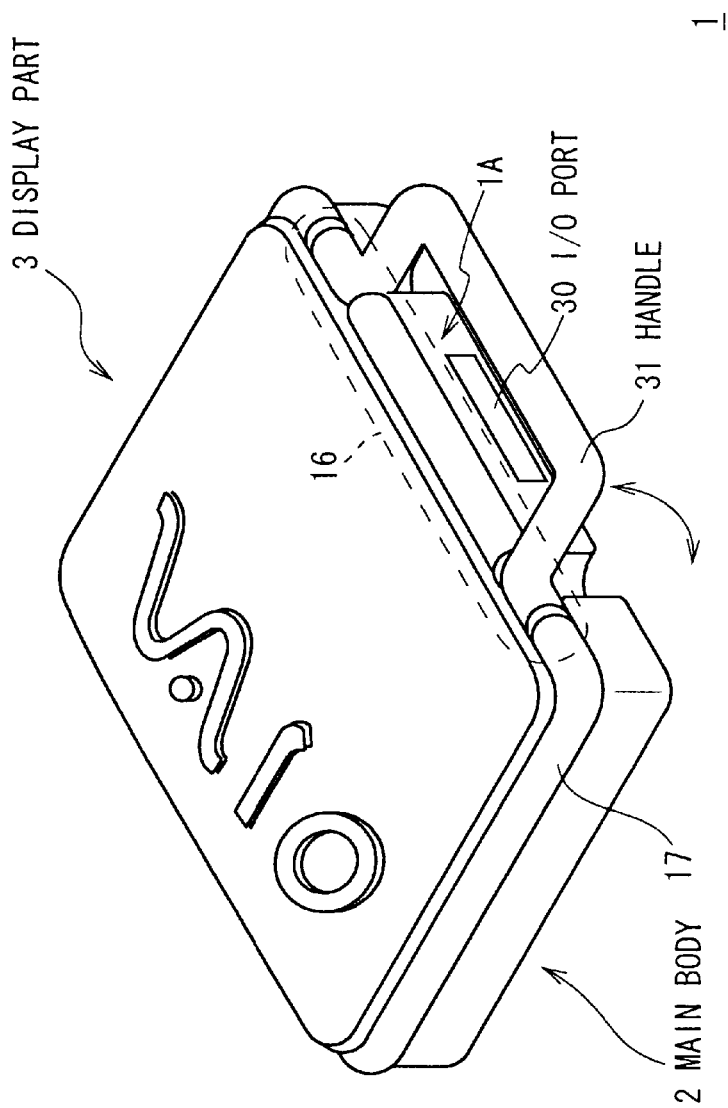
FIG. 7 is a schematic perspective view showing the structure of a rear surface of the notebook computer.

As shown in FIG. 7, provided on the rear surface 1A of the notebook computer 1 is an I/O port 30 in which various connectors such as a Universal Serial Bus (USB), a local area network (LAN), etc. are disposed. And to the hinge 16 on the rear surface 1A, a bow-shaped handle 31 made of a cylindrical member is attached so as to be turned within a predetermined angle with respect to the main body 2. The turning shaft of the display part 3 and the turning shaft of the handle 31 are on the same axis line (i.e. a turning shaft B shown in FIG. 10), and the outer diameter of the periphery protector 17 and the outer diameter of the handle 31 are the same so that the periphery protector 17 and the handle 31 look one piece.

Figure 8A:
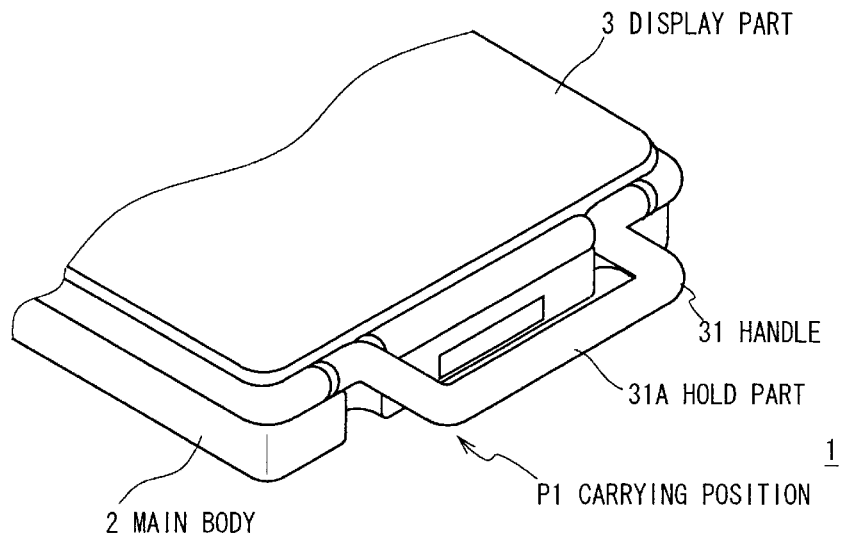
FIGS. 8A, 8B, 9A and 9B are schematic perspective views showing the turned states of a handle.
Figure 9A:
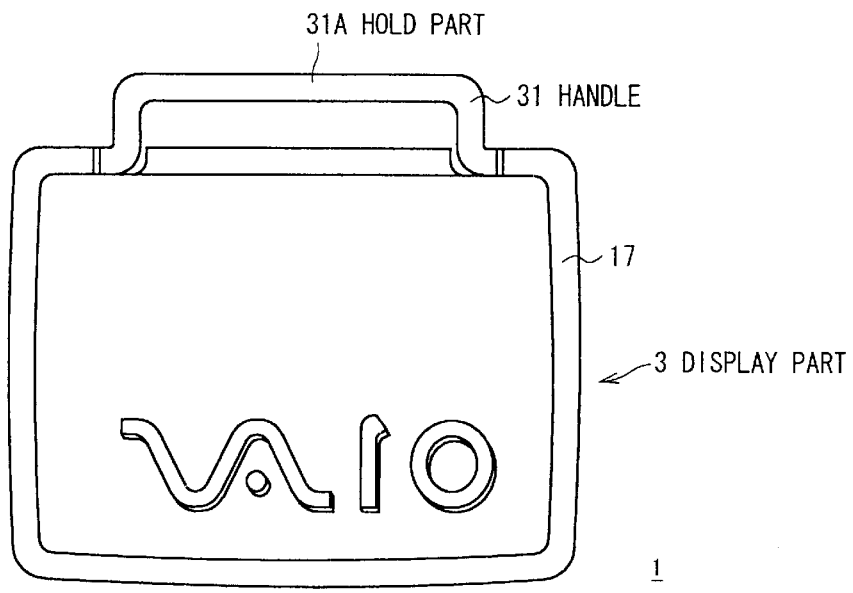

As shown in FIGS. 8A and 9A, by raising the handle 31 to be parallel to the main body 2, it can be used as a hold part in carrying the notebook computer 1 (this turned position is referred to as carrying position P1).

Figure 8B:
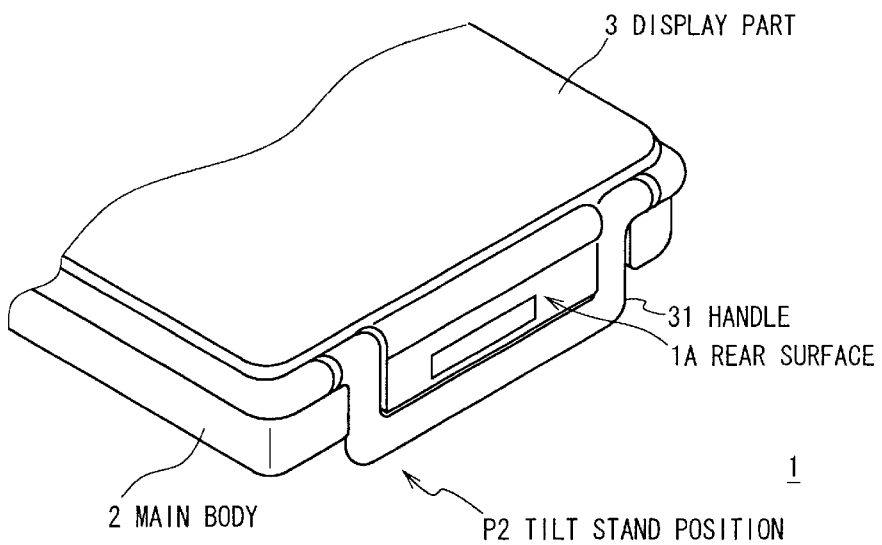
Figure 9B:
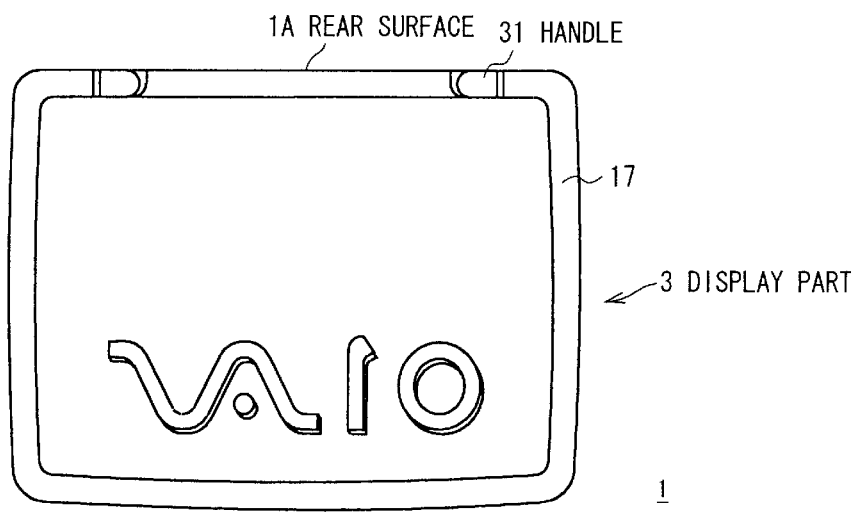
Figure 10:
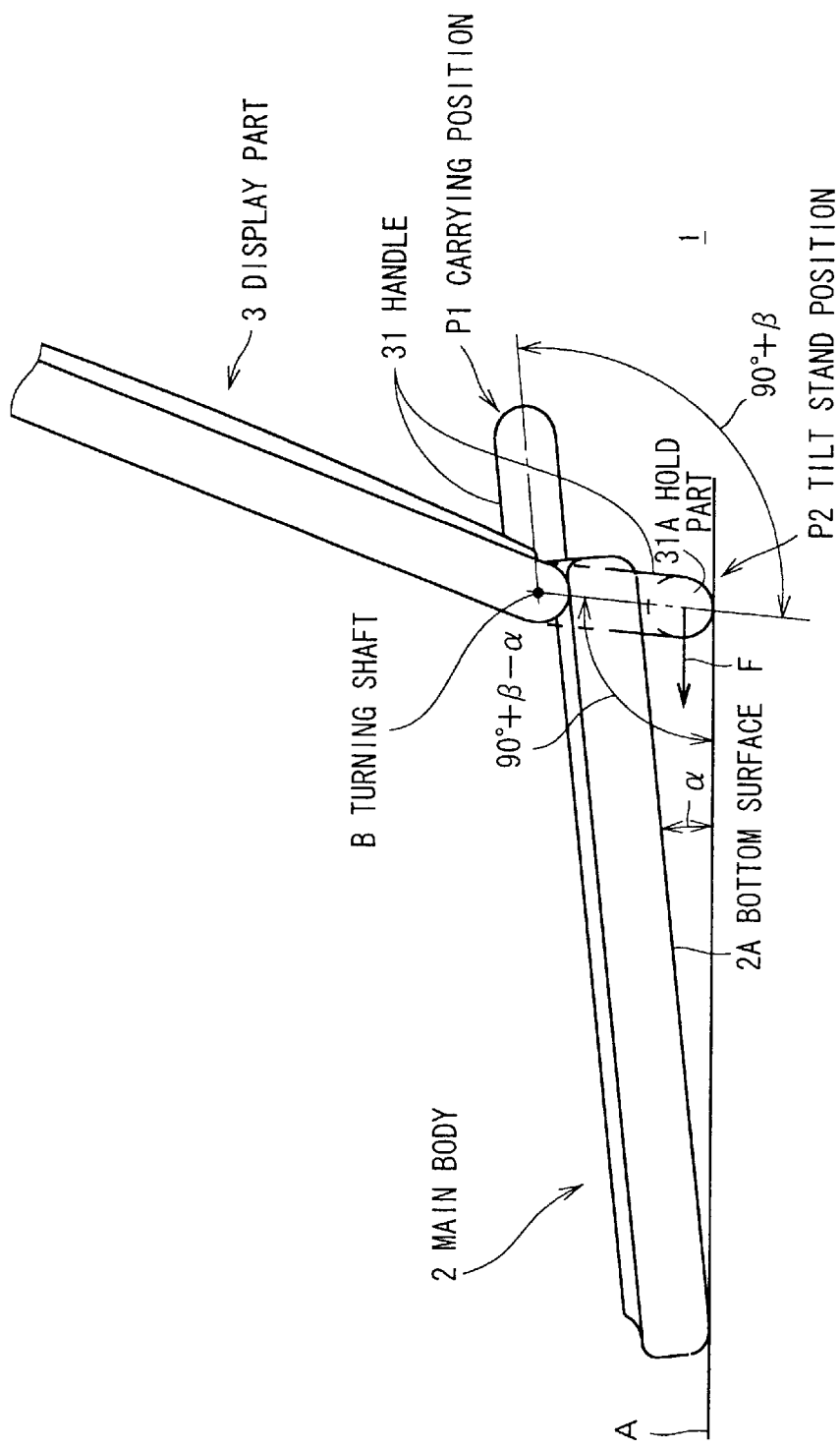
FIG. 10 is a schematic diagram showing the turned angle of the handle.

Moreover, as shown in FIGS. 8B and 9B, by turning downward and folding the handle 31, the dimension of the notebook computer 1 in the depth direction is shortened. Furthermore, as shown in FIG. 10, when the notebook computer 1 is placed on a desk etc. and the hold part 31A is turned so that the hold part projects from the bottom of the main body 2, the hold part 31A tilts the main body 2. Therefore, it can be used as a tilt stand to improve the operability of the keyboard 4 (this turned position is referred to as tilt stand position P2).

Figure 11:
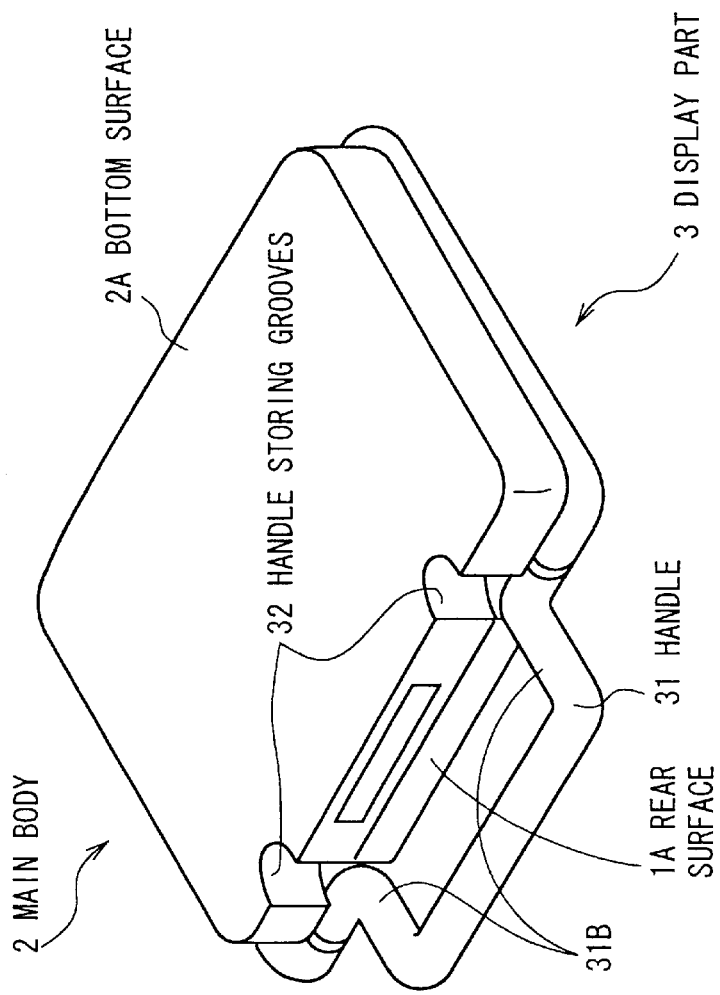
FIG. 11 is a schematic perspective view showing handle storing grooves.

As shown in FIG. 11, the main body 2 has handle storing grooves 32 at positions corresponding to the vertical parts 31B of the handle 31, so that the vertical parts 31B can be stored in the handle storing grooves 32 in the tilt stand position P2. It prevents the handle 31 from projecting from the rear surface 1A of the notebook computer 1.

As described above, in the notebook computer 1, by raising the handle 31 to the carrying position P1 in carrying, the hold part 31A is apart from the rear surface 1A and thereby it becomes more comfortable to hold the handle 31. On the other hand, in using, by turning the handle 31 to the tilt stand position P2, the vertical parts 31B of the handle 31 are stored in the handle storing grooves 32 and the dimension of the notebook computer 1 in the depth direction is shortened. At the same time, the main body 2 is inclined and the operability of the keyboard 4 can be improved.

As shown in FIG. 10, if assuming the inclined angle of the main body 2 with the handle 31 turned to the tilt stand position P2 as $\alpha$, the turned angle of the handle 31 ranging from the state in parallel to the main body 2 (that is, the carrying position P1) to 90°+$\beta$ (here, $\beta$>$\alpha$). Thus, the handle 31 in the tilt stand position P2 has an obtuse angle (90°+$\beta$-$\alpha$) with respect to a placing surface A.

Thereby, the handle 31 receives the force toward the direction of an arrow F by the weight of the notebook computer 1 and it is stable. Which can prevent the handle 31 from unexpectedly turning from the tilt stand position by external force in the notebook computer 1.

Figure 12A:
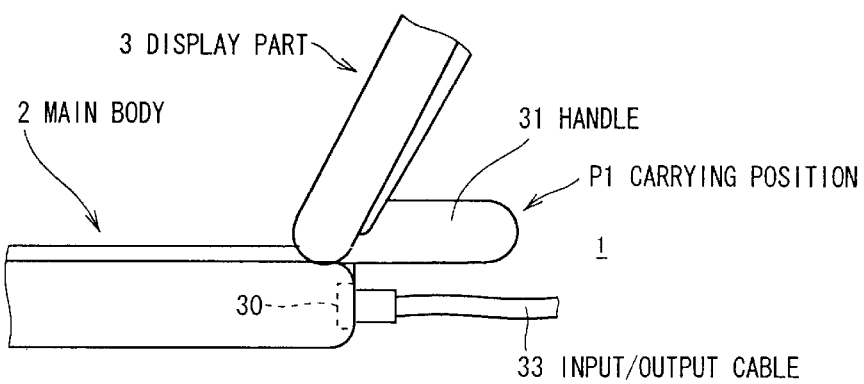
FIGS. 12A and 12B are schematic diagrams showing the interference states with an I/O cable by the handle.
Figure 12B:
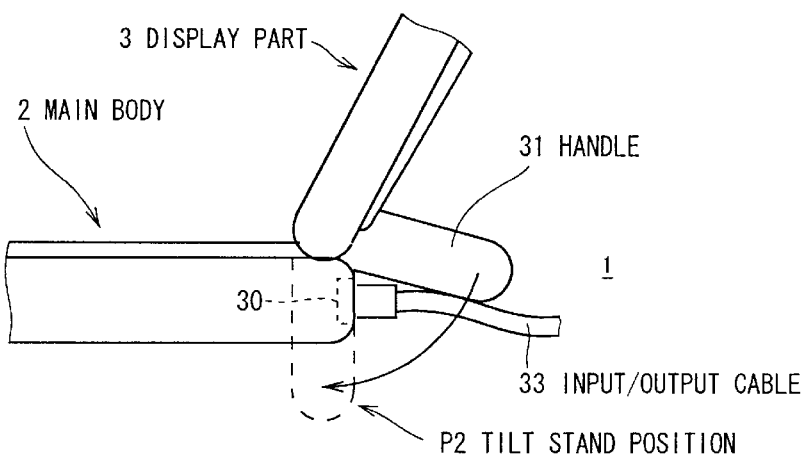

Further, the notebook computer 1 has the handle 31 above the I/O port 30. Thereby, if an I/O cable 33 is connected to the I/O port 30 while the handle 31 is in the carrying position P1 (FIG. 12A) and then the handle 31 is tried to be turned to the tilt stand position P2, the I/O cable 33 prevents the handle 31 from being turned to the tilt stand position P2, and the I/O port 30 or the I/O cable 33 may be broken (FIG. 12B).

Therefore, in the notebook computer 1, the handle 31 is set so as to be naturally turned downward by its weight when the notebook computer 1 is placed in almost parallel. Thereby, when placing the notebook computer 1 on a table etc., the handle 31 is automatically turned to nearly the tilt stand position P2, which prevents interference between the handle 31 and the I/O cable 33.

In the above structure, in this notebook computer 1, the bow-shaped handle 31 made of a cylindrical member is attached to the hinge 16 on the rear surface 1A so that its turning shaft is on the same axis line as the turning shaft of the display part 3.

Then, in this notebook computer 1, the handle 31 can be used as a hold part by raising it in parallel to the main body 2 when the notebook computer 1 is carried. On the other hand, when the notebook computer 1 is used, by turning downward and folding the handle 31, the main body 2 is inclined and the handle 31 can be used as a tilt stand to improve the operability of the keyboard 4.

Furthermore, in this notebook computer 1, the handle storing grooves 32 are provided at positions corresponding to the vertical parts 31B of the handle 31, and the vertical parts 31B are stored in the handle storing grooves 32 in the tilt stand position P2. Thereby, the handle 31 does not project from the rear surface 1A of the notebook computer 1, and the dimension of the notebook computer 1 in the depth direction in using can be shortened.

If the vertical parts 31B of the handle 31 are lengthened, the hold part 31A is further apart from the rear surface 1A when the notebook computer 1 is carried. Thereby, it becomes more comfortable to hold the handle 31, and the portability of the notebook computer 1 is also improved. On the other hand, however, when the notebook computer 1 is used, the hold part 31A may excessively project from the bottom surface 2A of the main body 2, the inclined angle of the main body 2 may become steep and the operability may deteriorate.

On the contrary, in the notebook computer 1 according to this invention, since the turning shaft of the handle 31 is on the same axis line as the turning shaft of the display part 3, the turning shaft of the handle 31 is placed on the main body 2. Therefore, the vertical parts 31B can be extended to a length corresponding to the thickness of the main body 2 while avoiding the projection of the hold part 31A from the bottom surface 2A of the main body 2. Thus, the notebook computer 1 can offer both of the portability and the operability in using.

According to the above structure, since the turning shaft of the handle 31 is on the same axis line as the turning shaft of the display part 3 and the handle storing grooves 32 are provided at positions corresponding to the vertical parts 31B on the rear surface 1A for storing the vertical parts 31B in the handle storing grooves 32. Thereby, when the notebook computer 1 is carried, the hold part 31A is sufficiently apart from the rear surface 1A to improve its portability. And when the notebook computer is used, the dimension of the notebook computer 1 in the depth direction is shortened and the main body 2 is moderately inclined to improve its operability.

Note that, the aforementioned embodiment has described the case where this invention has been applied to a notebook computer. This invention, however, is not only limited to this but also this invention can be applied to other various portable information processing devices such as personal digital assistants (PDA), word processors, etc.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing device comprising:

a main body a display part provided so as to be turned on a turning shaft with respect to said main body; and a handle, having vertical parts that are vertical to said turning shaft of said display part and a hold part that is connected to said vertical parts and is arranged side by side at a specified distance from said turning shaft, said handle being rotatably mounted on the same axis line as the turning shaft of said display part so as to be turned with respect to said main body, wherein when said body is placed, said handle is turned to the main body, and said hold part is positioned under the bottom surface of said main body to incline said main body.

2. The information processing device according to claim 1 wherein said main body has storing parts for storing said vertical parts when said handle is turned to the main body.

3. The information processing device according to claim 2, wherein when said main body is placed, said vertical parts of said handle have an obtuse angle with respect to the placing surface.

* * * * *